UNITED STATES PATENT OFFICE.

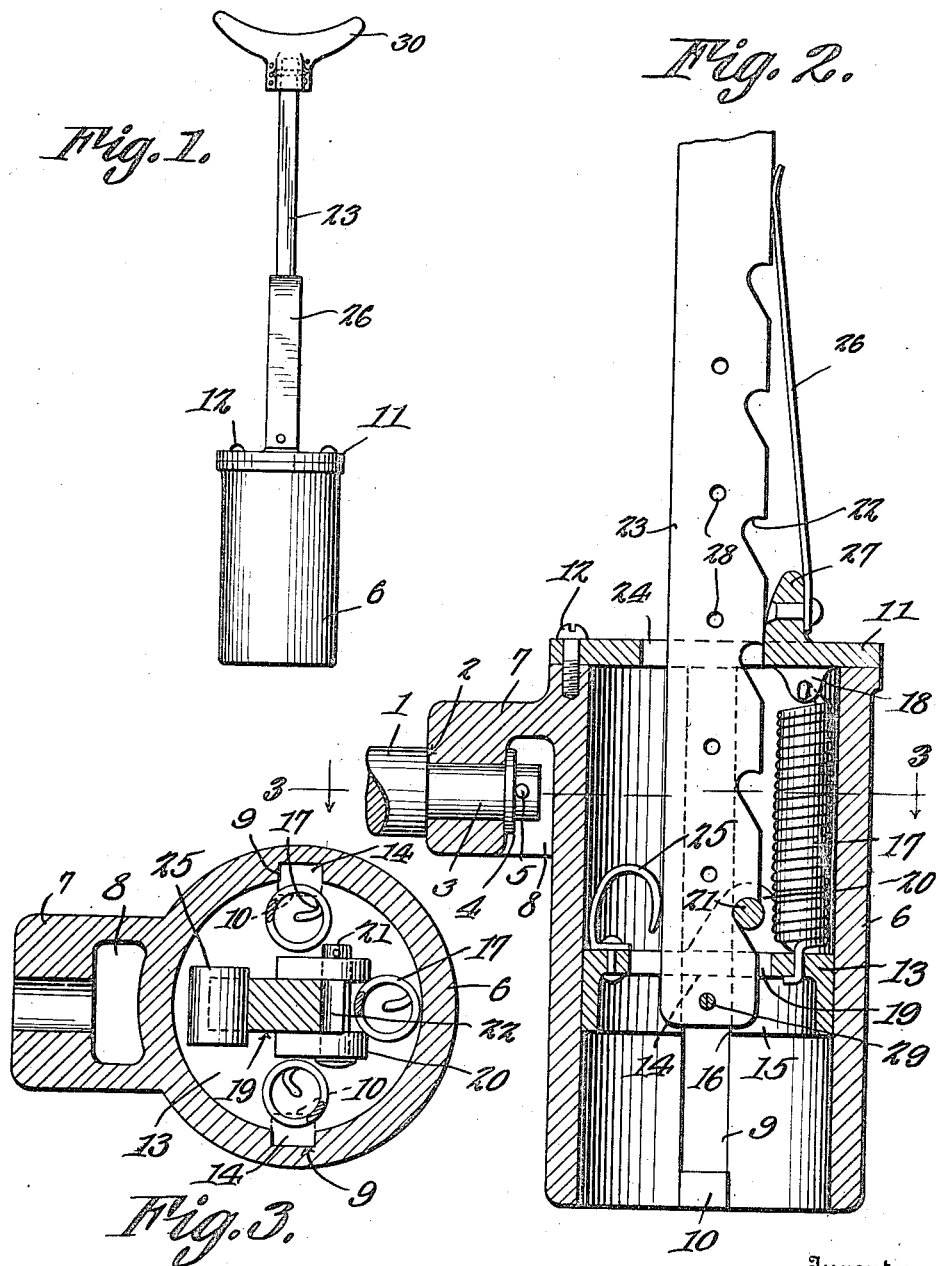
C. KUDERER.
MOTOR CYCLE BACK REST.
APPLICATION FILED MAR. 5, 1918.
1,281,398. Patented Oct. 15, 1918.

CHARLES KUDERER, OF PITTSBURGH, PENNSYLVANIA.

MOTOR-CYCLE BACK-REST.

1,281,398.  Specification of Letters Patent.  Patented Oct. 15, 1918.

Application filed March 5, 1918. Serial No. 220,560.

*To all whom it may concern:*

Be it known that I, CHARLES KUDERER, a citizen of the United States, residing at Pittsburgh, in the county of Allegheny and State of Pennsylvania, have invented a new and useful Motor-Cycle Back-Rest, of which the following is a specification.

The device forming the subject matter of the present invention is a motor cycle back rest which, while ordinarily intended for use on such vehicles, is not confined to such use but is adapted for use on other cycles, or any conveyance to which it is found applicable.

The invention contemplates the provision of means engaging the arm pits of the rider for partially supporting the rider and relieving the spine from strain and shock.

A further object within the contemplation of the invention is the provision of means for yieldingly supporting the arm pit engaging members.

The invention also contemplates an adjustable arm pit engaging support.

A still further object within the contemplation of the invention is the production of a structurally improved motor cycle back rest of enhanced utility.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

One practical embodiment of the invention is illustrated in the accompanying drawing, wherein:—

Figure 1 is a view in side elevation of a support constructed in accordance with the invention;

Fig. 2 is an enlarged fragmentary view in longitudinal section of the device, parts being in elevation;

Fig. 3 is a transverse section on the line 3—3 of Fig. 2.

Referring to the drawing by numerals of reference:—

In carrying out the invention a suitable base or support is provided which consists of a cross bar 1, which bar is adapted to be assembled in any desired manner with a cycle seat, not shown, and the cross bar is provided at each end with a shoulder 2 from which projects the reduced end or stem 3. A washer 4 surrounds the stem 3 upon which it is held by a retaining element 5 inserted through an opening or bore formed transversely of the stem 3.

As the main parts of the invention which are supported at each end of the bar 1, and upon the stems 3, are duplicates, only one has been illustrated in the drawing, and will be described in the following description.

There is provided a tubular base 6 having a laterally extending lug 7, which lug has formed therein a recess 8 extending upwardly from the bottom thereof. The outer wall of the lug 7 is bored or apertured to receive the stem 3 with the end of the stem containing the washer 4 and the retaining element 5 extending within the recess 8. By this means the support and its base 6 are mounted for rotary movement in a plane parallel with the direction of travel of the cycle.

The tubular base 6 has opposed grooves 9 formed in the inner face thereof and extending longitudinally of the base, and the lower ends of these grooves are closed by lugs 10 which extend inwardly from the walls of the tubular base 6. The upper end of the tubular base 6 is headed or closed by a plate 11 which is secured in place by screws 12 or otherwise.

Mounted for rectilinear movement within the tubular base 6 is a disk like follower 13, formed with opposed radially extending lugs 14 which are adapted to enter the grooves 9 and so prevent the follower from turning with respect to the tubular base. The follower is provided with a peripheral depending annular flange 15 for the purpose of alining the follower in the tubular base and so preventing it tilting or jamming. This flange 15 may be formed with opposed slots 16 which are formed to receive the lugs 10 when the follower is in its lowermost position.

Formed in the disk like follower 13 and spaced circumferentially thereof are apertures adapted to receive the lower ends of retractile springs 17 for the purpose of securing the springs to the follower. The upper ends of these springs are made fast to apertured lugs or ears 18 which depend from the top or head 11 and so form a yielding support or hanging means for the follower 13.

The following 13 has a slot 19 formed diametrically thereof, and rising from the follower at each side of one end of the slot are ears 20, which are apertured to receive a pin 21. The pin 21 is provided to selectively enter notches 22 formed in one edge of a bar 23, the lower end of which bar is slidable through the slot 19 and also through a slot 24 formed in the head 11. The bar 23 is held in upright position with its notched edge in proper contact with the pin 21 by means of a curved leaf spring 25 which is riveted or otherwise secured to the follower 13, from which it rises, and by a spring 26 which is riveted or otherwise secured to a lug 27 which rises from the head 11. The bar 23 has spaced longitudinally thereof a series of apertures 28 adapted to selectively receive a cotter pin 29, or like element, for the purpose of limiting the upward movement of the bar. A cross head 30, in the form of a shoulder rest, is riveted or otherwise secured to the upper end of the bar 23 and engages the arm pit of the rider and serves as a rest and support.

When it is desired to raise or lower the bar 23 for the purpose of accommodating the same to the height of the user, the bar is swung upon the lug 27 as a fulcrum and against the springs 25 and 26, thus releasing the bar from the pin 21. The bar may now be moved upwardly or downwardly to bring the pin 21 into another notch and so adjust the height of the bar 23. The spring 26 also serves to yieldingly hold the arm rest 30 against the side of the person using the device so that the device may accommodate itself to persons of different sizes and may also allow a reasonable amount of play or movement to the body.

It is also apparent that the bar 23 may be dropped down through the base 6 when the device is not to be used and so have the bars out of the way of the occupant of the vehicle.

Having thus described the invention, what is claimed as new and sought by Letters Patent, is:—

1. In a cycle back rest, a cycle seat, a tubular base, means for pivotally assembling the base with the seat, a follower mounted to reciprocate in the base, a suporting bar adjustably attached to the follower, and means for limiting the downward movement of the follower.

2. In a cycle back rest, a cycle seat, a tubular base, means for assembling the base with the seat, a follower mounted to reciprocate in the base, means for yieldingly supporting the follower, a supporting bar secured for adjustment to the follower, and means for limiting the downward movement of the follower.

3. In a cycle back rest, a cycle seat, a tubular base, means for assembling the base with the seat, a follower mounted to reciprocate in the base, interengaging elements on the casing and the follower coacting to prevent a rotation of the follower, and a supporting bar secured for adjustment to the follower.

4. In a cycle back rest, a cycle seat, a tubular base, means for pivotally assembling the base with the seat for swinging movement in a direction parallel to the line of advance of the cycle, a follower mounted to reciprocate in the base, a supporting bar, means for securing the supporting bar for adjustment to the follower, and means for limiting the downward movement of the follower.

5. In a cycle back rest, a cycle seat, a tubular base, means for pivotally assembling the base with the seat for swinging movement in a direction parallel to the line of advance of the cycle, a follower mounted to reciprocate in the base, means for yieldingly supporting the follower, a supporting bar, and means for securing the supporting bar for adjustment to the follower.

6. In a cycle back rest, a cycle seat, a tubular base, means for assembling the base with the seat, and a supporting bar pivoted for adjustment in the base and for restricted swinging movement transversely of the cycle.

7. In a cycle back rest, a cycle seat, a tubular base, means for assembling the base with the seat, and a supporting bar mounted for vertical adjustment in the base and to be telescoped through the base when not in use.

In testimony that I claim the foregoing as my own, I have hereto affixed my signature in the presence of two witnesses.

CHARLES KUDERER.

Witnesses:
ANNA A. MILLIGAN,
C. B. MILLIGAN.